(No Model.)
G. RIESECK.
MASH MACHINE.
No. 411,903.    Patented Oct. 1, 1889.
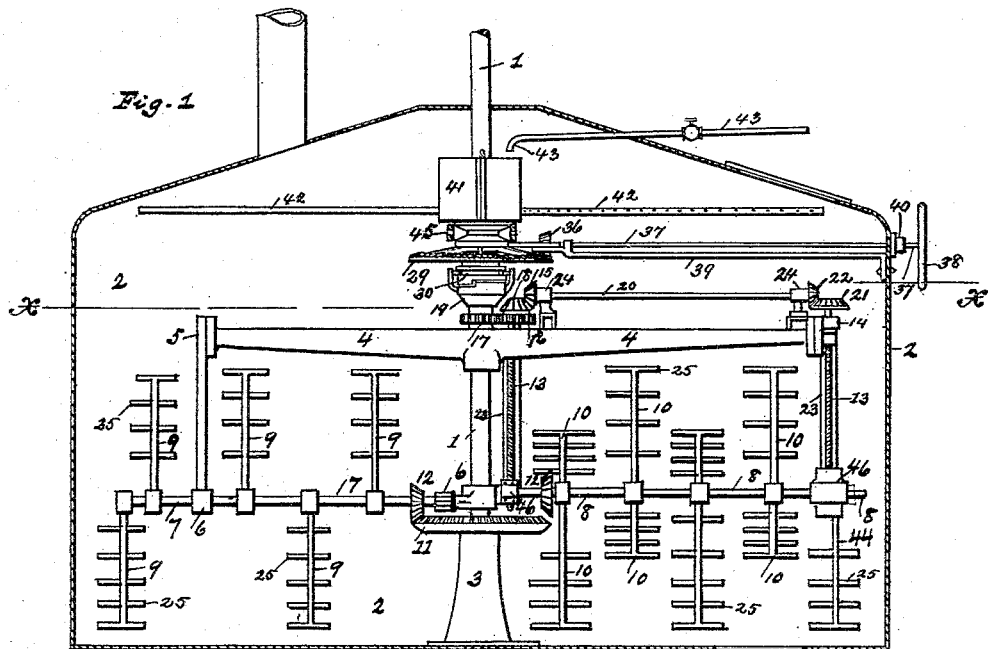
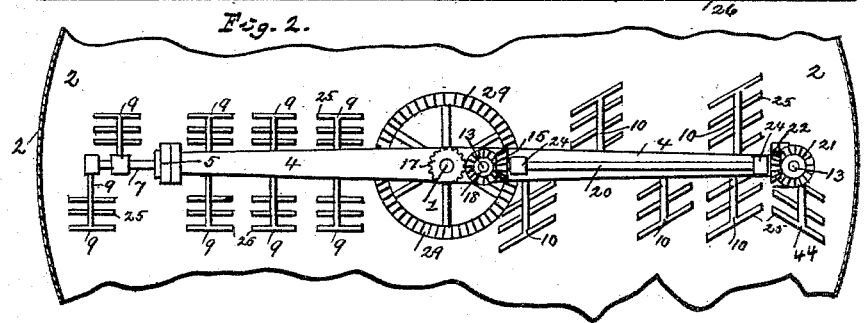
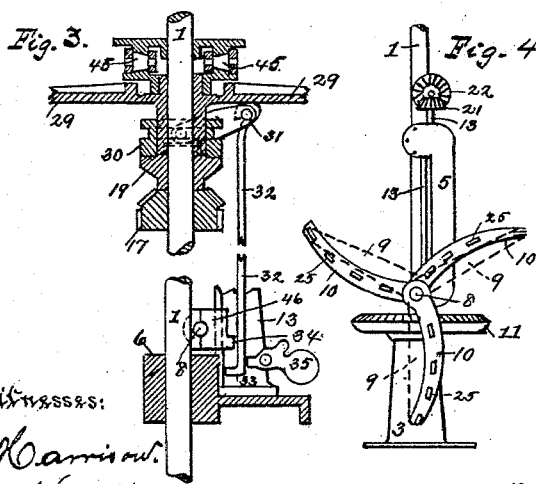
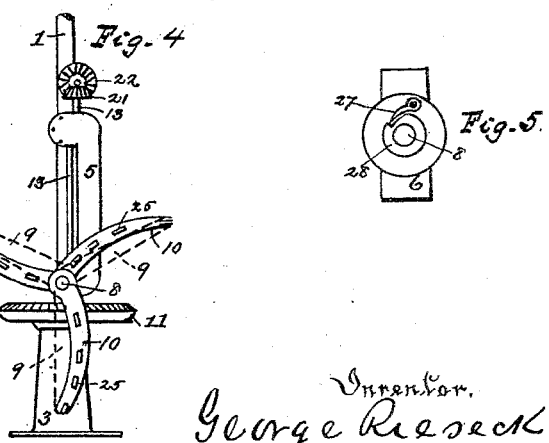
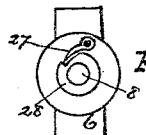
Witnesses:
W. E. Harrison.
J. A. Stinson.
Inventor.
George Rieseck
Per O. D. Lewis
Atty.

UNITED STATES PATENT OFFICE.

GEORG RIESECK, OF ALLEGHENY, PENNSYLVANIA.

MASH-MACHINE.

SPECIFICATION forming part of Letters Patent No. 411,903, dated October 1, 1889.

Application filed May 31, 1887. Serial No. 239,877. (No model.)

*To all whom it may concern:*

Be it known that I, GEORG RIESECK, a citizen of the United States, residing at Allegheny, in the county of Allegheny and State of Pennsylvania, have invented certain new and useful Improvements in Mash-Machines; and I do hereby declare the following to be a full, clear, and exact description of the invention, such as will enable others skilled in the art to which it pertains to make and use the same, reference being had to the accompanying drawings, which form a part of this specification.

My invention relates to an improvement in mash-machines and grain-removers, the object being to provide a machine whereby grain placed in a large tank or receptacle may be mashed for the purpose of manufacturing beer, &c., and also to construct the machine in such a manner that the same may be used for removing the grain from the tank; and with these ends in view my invention consists in certain details of construction and combination of parts, as will be fully described hereinafter.

In the accompanying drawings, Figure 1 is a side elevation of my improved mash-machine and grain-remover constructed in accordance with my invention, which figure shows the position the machine is made to occupy in the tank. Fig. 2 is a sectional plan view of the same, taken on line x x. Fig. 3 is an enlarged sectional elevation of the automatically-working clutch and frictional rollers. Fig. 4 is an end elevation of the machine. Fig. 5 is an enlarged end view of the locking device for the movable or rotating shaft.

To put my invention into practice, I provide a stout shaft 1 and secure the same in a vertical position in the center of a large tank or tub 2. The base of this shaft 1, I loosely secure in a standard 3, which is firmly attached to the bottom of the tub or tank 2. At some distance above the bottom of the tank 2, I attach rigidly to the central shaft 1 a strong beam 4, projecting on both sides of the shaft 1. From one extremity of this beam 4 is a downwardly-projecting support 5, which, in connection with a suitably-constructed bearing 6, firmly secured to the central shaft 1, serves as a support for one of the horizontal shafts 7, to which is attached a suitable number of radially-projecting mash-arms 9. From the other extremity of this beam 4, and at a point near the central shaft 1, are attached two downwardly-extending parallel guide bars or rods 23, to which are attached loosely the journal-boxes 46 for the horizontal shaft 8, to which is affixed a series of radially-projecting mash-arms 10. Near the lower extremity of the central shaft 1, and immediately above the standard 3, is a large bevel-toothed wheel 11, which meshes with small bevel-pinions 12, rigidly attached to the horizontal shafts 7 8. This large bevel-wheel 11 is secured to and remains stationary with the standard 3, which being the case compels the horizontal shafts 7 8 and mash-arms 9 10 to rotate when the pinions 12 are in gear with the toothed wheel 11 and the central shaft 1 revolved.

The horizontal shaft 8 on the right of the central shaft 1 is capable of being moved vertically in order to lift the same above the mass of grain in the tank, so that the mash arms or paddles 10 will be free of the grain when the shaft has been adjusted in position to commence the operation of removing the grain from the tank 2. At each end of this horizontal shaft 8 is arranged a vertical elevating-screw 13, the two screws being oppositely threaded and passing through suitable plain apertures in the beam 4, and having their lower ends working in threaded openings in the sliding bearings 46, which are connected to and guided on the fixed guide-bars 23, whereby, when the elevating-screws 13 are simultaneously rotated, the sliding bearings and the shaft 8, journaled therein, will be elevated or depressed, according to the direction of rotation of the screws 13, as is obvious. To the upper extremity of the screw 13 nearest the central shaft 1 is attached a small pinion 16, which meshes with another 17 of a suitable size, rigidly secured to the lower portion of a clutch 19, which will be more fully described hereinafter. On the top of the small pinion 16, and integral therewith, is a bevel-pinion 18, which meshes with another 15, mounted on a horizontal shaft 20, secured in proper bearings 24 to the top of the cross-beam 4. To the other end of this shaft 20 is attached another pinion 22, which is made to operate the outer screw 13 by means of a bevel-pinion 21, attached to the same. At the rear of each of these screws are the vertical fixed guide bars or rods 23, over which take or fit rearwardly-projecting flanges on the sliding bearings 46 of the shaft 8, as indicated by dotted lines in Fig. 3.

The mash-arms 9 10, secured to the two shafts 7 8, are formed with a number of outwardly-projecting blades 25, which arms 9 10 are arranged radially at regular intervals about the shafts 7 8. Those arms attached to the vertically-moving shaft 8 are inclined and set in such a manner as to sweep the grain toward an opening 26 in the bottom of the tank 2. When the machine is used for this purpose, the shaft 8 occupies a position such as shown at Figs. 1 and 4 on the drawings, and is prevented from any rotary movement on its axis by a small pawl 27, operating in a notch formed in a collar 28, rigidly secured to the shaft 8. Directly above the small pinion 17, and attached thereto, is arranged the lower half of a clutch 19, secured loosely to the central shaft 1. Above this is arranged by means of a spline formed on a sleeve a part of a toothed wheel 29, above the other portion 30 of the clutch, which is capable of being moved vertically a short distance. This portion 30 of the clutch is operated vertically by a suitably-fulcrumed lever 31 and downwardly-extending rod 32, provided at its lower extremity with a hook 33, which engages at the proper time with a projection 34, formed on the side of the journal-box 46 of the shaft 8. A movable latch 35 serves to hold the rod 32 in the proper position to engage with the projection 34 and also disengage the same. The object of this mechanism will be set forth hereinafter.

Above the clutch 19 30, and loosely attached to the central shaft 1, is a large toothed wheel 29, which meshes with a small pinion 36, mounted on one end of a shaft 37, supported by a frame 39 and extending to the outside of the tank 2, at which point is a large hand-wheel 38, by which means the said gear-wheels 29 36 may be operated. This shaft 37 is so arranged as to be capable of a limited movement in the direction of its length in order to disengage the pinion 36 from the toothed wheel 29. This shaft 37 is provided with a suitably-constructed clutch 40, secured to the outside of the tank, so arranged and constructed as to lock the shaft 37 and pinion 36, when desired, and prevent the same from rotating on their axis. Above this toothed wheel 29, loosely surrounding the central shaft 1, is a small water-tank 41, constructed in two parts, in order to easily attach the same in position, mounted on frictional rollers 42 to give the same an easy rotary movement. From the bottom of this tank 41 are two outwardly-projecting discharge-pipes 42, having their extremities closed and a series of minute perforations arranged in one side of one of the pipes and in the opposite side of the other.

The discharge end of a water-supply pipe 43 is arranged over the open top of this tank 41 for the purpose of supplying the same with water. Below the outer screw 13, I secure rigidly to the outer journal-box a downward-extending scraper 44, of the same form as the mash-arms 10. The base of the guide-bar 23, next the central shaft 1, I attach to the bearing 46, which serves to better support the same.

In operation malt is placed in the bottom of the tank, the water let into the tank 41, and the central shaft 1 given a rotary movement by means of suitable gearing attached thereto. The cross-beam 4 being attached to shaft 1, the same is revolved about its pivotal point, the small pinions 12 operating in the large toothed wheel 11, which, being stationary, rotates the shafts 7 8, thereby striking the malt, mashing and pressing the same. This operation is continued until the process of mashing is completed. Water is let into the small tank 41, which commences to operate as soon as a sufficient supply has collected therein. The water escaping from opposite sides of the pipes 42 meets with sufficient resistance from the atmosphere to cause the tank 41 to revolve, and in so doing sprinkles the grain with water. The supply of water when shut off from the tank 41 causes the apparatus to stop. When it is desired to remove the grain from the tank 2, the shaft 8, together with all of its attachments, is raised above or to the level of the grain by means of the hand-wheel 38 operating the mechanism for that purpose. The clutch 19 30 is now engaged and the small pinion 36 and shaft 37 locked. When the mash-machine is started by means of the small pinions operating the screws 13, the same are revolved, which operation gradually lowers the shaft 8, which is held stationary by the pawl 27 in a position such as shown at Fig. 4 on the drawings, which operation commences to remove the grain from the top instead of the bottom. The arms 10 and projecting blades 25, being arranged in a peculiar position, gradually work or sweep the grain toward and into the opening 26 in the floor of the tank, thus virtually cleaning the entire tank of its contents. The small pinion 12, secured to the vertically-moving shaft 8, having approached by this time the large toothed wheel 11 and the hook 33 caught in the projection 34, the clutch 19 30 is disengaged, which stops the downward movement of the shaft 8. The operator now enters the tank 2, disengages the hook 33, (the apparatus being stopped,) and the shaft 8 further lowered by means of the hand-wheel 38 until such time as the small pinion 12 has been properly engaged with the toothed wheel 11, which operation will prevent the stripping of the teeth of the gearing.

Having thus described my invention, what I claim, and desire to secure by Letters Patent, is—

1. In a mash-machine, the combination, with the power-shaft and a rigid arm extending angularly therefrom, of a rotatable mixer-shaft provided with the usual mixers and vertically adjustable, whereby said mixers may be brought into or out of contact with the mash, and suitable means whereby to adjust said mixer-shaft.

2. In a mash-machine, the combination, with a vertical power-shaft located axially on the mash-tub, of a longitudinal arm rigidly fixed upon said shaft toward the top of the mash-tub, guides depending from said arm toward the respective ends thereof, a mixer-shaft adjustable vertically along said guides, and suitable means for raising and lowering said shaft, substantially as described.

3. In a mashing-machine, the combination, with a vertical rotary shaft 1, carrying a shaft 7, having a series of mash arms or paddles 9, and a fixed gear-wheel with which the shaft 7 meshes, of a vertically-movable shaft 8, mounted in sliding bearings and adapted to gear with the fixed gear-wheel when lowered, and elevating-screws for raising said shaft 8 at any desired elevation within the mash-tub, substantially as and for the purpose described.

4. In a mashing-machine, the combination, with a vertical rotary shaft 1, carrying a horizontal shaft 7, having a series of mash-arms, and a fixed gear-wheel with which said horizontal shaft is normally geared, of a vertically-movable shaft 8, journaled in sliding bearings and adapted when lowered to gear with the fixed gear-wheel and be rotated thereby, the elevating-screws 13, for raising the shaft 8 and bearings, and mechanism, substantially as described, for simultaneously rotating the elevating-screws, substantially as and for the purpose described.

5. In a mashing-machine, the combination of a vertically-movable horizontal shaft 8, journaled in sliding bearings and having a series of arms, a vertical shaft 1, carrying upright guides 23, upon which the sliding bearings are fitted, the elevating-screws working in the bearings, a shaft 20, geared to both screws to simultaneously rotate the same, a clutch fitted on the vertical shaft and having one section thereof normally geared with the screw-operating shaft, and an externally-operated shaft adapted to rotate the clutch and the screws to adjust the vertically-movable shaft, substantially as and for the purpose described.

6. In a mashing-machine, the combination of a vertically-movable shaft 8, carrying a series of mash-arms and journaled in sliding bearings, a vertical shaft 1, carrying the beam 4 and the vertical parallel guides 23, upon which the sliding bearings work, the elevating-screws, a horizontal shaft 20, geared to the elevating-screws to simultaneously rotate the same, the clutch fitted on the vertical shaft and having one section thereof geared with the shaft 20, a gear-wheel 28, secured to the other section of the clutch, and an externally-operated rotatory shaft 37, adapted to gear with the wheel 29 to rotate the clutch and the elevating-screws, substantially as and for the purpose described.

7. In a mashing-machine, the combination, with a vertical shaft 1 and a fixed gear-wheel 11, of a vertically-movable shaft 8, carrying a series of mash-arms and journaled in sliding bearings, fixed guides for the bearings, the elevating-screws, a clutch fitted on the vertical shaft and having one section thereof geared with the elevating-screws, an externally-operated shaft for rotating the clutch, and tripping devices for automatically uncoupling the clutch-sections when the vertically-movable shaft reaches its lowest limit and gears with the fixed gear-wheel, substantially as and for the purpose described.

8. In a mashing-machine, the combination, with a vertical shaft 1 and a fixed gear-wheel 3, of a vertically-movable shaft 8, carrying a series of mash-arms and journaled in sliding bearings 46, one of which has a lug 34, the elevating-screws to rotate the same simultaneously, a clutch having one section thereof geared with the screw-operating shaft, and an operating-rod 32, connected at one end with one section of the clutch and adapted to strike the lug 34 when the shaft 8 is lowered, to thereby uncouple the sections of the clutch, substantially as and for the purpose described.

9. In a mashing-machine, the combination, with a vertical shaft 1, carrying the horizontal rotary shafts 8, provided with the mash-arms, of a sectional water-reservoir fitted loosely on the vertical shaft above the horizontal shafts and supported on friction-rollers which rest upon a suitable support, the horizontal radial pipes 42, secured to the reservoir and having a series of fine perforations formed in opposite sides, and a pipe for supplying water to the reservoir, substantially as and for the purpose described.

GEORG RIESECK.

Witnesses:
M. E. HARRISON,
H. T. MORRIS.